United States Patent
Queisser et al.

(12)
(10) Patent No.: US 6,670,443 B1
(45) Date of Patent: Dec. 30, 2003

(54) METHOD FOR THE PRODUCTION OF OLEFIN/CARBON MONOXIDE COPOLYMERS

(75) Inventors: Joachim Queisser, Mannheim (DE); Michael Geprägs, Lambsheim (DE); Bernhard Rieger, Ulm (DE); Wolfgang Huhn, Francavilla al Mare (IT)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/030,433

(22) PCT Filed: Jul. 5, 2000

(86) PCT No.: PCT/EP00/06298

§ 371 (c)(1), (2), (4) Date: Jan. 10, 2002

(87) PCT Pub. No.: WO01/07503

PCT Pub. Date: Feb. 1, 2001

(30) Foreign Application Priority Data

Jul. 21, 1999 (DE) .......................................... 199 33 383

(51) Int. Cl.$^7$ .............................................. C08G 85/00
(52) U.S. Cl. ......................................... 528/392; 526/66
(58) Field of Search ............................. 528/392; 526/66

(56) References Cited

U.S. PATENT DOCUMENTS 6,037,443 A    3/2000   Mueller et al. ............. 528/392

FOREIGN PATENT DOCUMENTS

| EP | 121 965 | 10/1984 |
|---|---|---|
| EP | 305 011 | 3/1989 |
| EP | 428 228 | 5/1991 |
| EP | 429 105 | 5/1991 |
| EP | 460 743 | 12/1991 |
| EP | 590 942 | 4/1994 |
| EP | 619 334 | 10/1994 |
| EP | 705 045 | 3/1996 |
| WO | 97/34943 | 9/1997 |
| WO | 00/20487 | 4/2000 |

OTHER PUBLICATIONS

Macro.1994,27,7215–7216, Jiang et al.
Chem.Commun.1998 401–402, Verspui et al.
Chem.Rev.1996,96,663–681, Drent et al.
Macro.Chem.Phys,198,1197–1208 (1997) Abu–Surrah et al.
Macromolecules 1992,25,3604–3606,Barsacchi et al.
Macromol.RapidComm. 17, 559–565(1996)Abu–Surrah et al.

*Primary Examiner*—Samuel A. Acquah
(74) *Attorney, Agent, or Firm*—Keil & Weinkauf

(57) ABSTRACT

A process for preparing linear, alternating carbon monoxide copolymers, in which at least one olefinically unsaturated compound having from two to twenty carbon atoms (component K1) and carbon monoxide are copolymerized in the presence of a) metal complexes,
   b) if desired, a protonic or Lewis acid, and
   c) if desired, a hydroxyl compound, comprises metering into the copolymerization, as it proceeds, at least one olefinically unsaturated compound having from two to twenty carbon atoms (component K2≠component K1) in the form of pulses, i.e. as a regular or irregular sequence of feed, for which the term pulse is used, and non-feed.

Carbon monoxide copolymers obtainable from said process are used for producing fibers, films or moldings, and the fibers, films and moldings produced from these polymers are described.

10 Claims, No Drawings

METHOD FOR THE PRODUCTION OF OLEFIN/CARBON MONOXIDE COPOLYMERS

The present invention relates to a process for preparing linear, alternating carbon monoxide copolymers, in which at least one olefinically unsaturated compound having from two to twenty carbon atoms (component K1) and carbon monoxide are copolymerized.

Linear, alternating copolymers made from carbon monoxide and olefinically unsaturated compounds, for which the abbreviated terms carbon monoxide copolymers or polyketones are also used, are known. High-molecular-weight semicrystalline polyketones with a strictly alternating sequence of the monomers in the main chain, for example, generally have high melting points, good heat resistance, good chemicals resistance, good barrier properties with respect to water and air, and also advantageous mechanical and rheological properties.

Of particular industrial interest are polyketones made from carbon monoxide and two olefins, generally α-olefins, for example carbon monoxide-ethene-propene copolymers, carbon monoxide-ethene-1-butene copolymers, carbon monoxide-ethene-1-hexene copolymers, carbon monoxide-propene-1-butene copolymers and carbon monoxide-propene-1-hexene copolymers.

There are known transition-metal-catalyzed processes for preparing polyketones. For example, EP-A 0 121 965 describes the use of a cis-palladium complex [Pd(Ph$_2$P(CH$_2$)$_3$PPh$_2$)](OAc)$_2$ (Ph=phenyl, Ac=acetyl) chelated with bidentate phosphine ligands. The copolymerization of carbon monoxide may be carried out in suspension, as described in EP-A 0 305 011, or in the gas phase, for example as in EP-A 0 702 045. Frequently used suspension media are low-molecular-weight alcohols, in particular methanol (see also EP-A 0 428 228), and nonpolar or polar aprotic liquids, such as dichloromethane, toluene or tetrahydrofuran (cf. EP-A 0 460 743 and EP-A 0 590 942). Another known reaction medium is water (see Jiang and Sen, Macromolecules, 1994, 27, pp. 7215–7216, and Verspui et al., Chem. Commun., 1998, pp. 40–402). Besides the use of water-soluble catalysts in the polyketone preparation processes carried out in an aqueous medium it is also possible to use solubilizers or to use hydroxyl compounds which act as an activator.

Compounds which have proven to have good suitability for said polymerization processes are in particular complexes with bisphosphine chelating ligands, where the radicals on the phosphorus are aryl groups or substituted aryl groups. Accordingly, particularly frequently used chelating ligands are 1,3-bis(diphenylphosphino)propane and 1,3-bis[di(o-methoxyphenyl)phosphino]propane (see also Drent et al., Chem. Rev., 1996, 96, pp. 663–681). In said cases the carbon monoxide copolymerization is usually carried out in the presence of acids.

A common feature of the said processes is that either the entire amount of the starting materials, carbon monoxide and olefins, forms the initial charge prior to the start of the polymerization or individual starting materials or all of the starting materials are metered in continuously during the polymerization.

When the process is conducted continuously, one or more of the starting materials are metered in for the entire duration of the polymerization. This gives copolymers composed predominantly of units built up from carbon monoxide and the fastest-reacting olefin and containing essentially a smaller proportion of units which have been built up from carbon monoxide and slower-reacting olefins. The various carbon monoxide-olefin units have a random distribution in the polymer (Drent et al., Chem. Rev., 1996, 96, pp. 663–681, Rieger et al., Macromol. Chem. Phys. 1997, 198, pp. 1197–1208 and Barsacchi et al., Macromolecules, 1992, 25, pp. 3604–3606).

If the entire amount of all of the starting materials forms an initial charge prior to the polymerization (batch process) the copolymers obtained have molecules initially built up practically exclusively from units which are formed from carbon monoxide and the fastest-reacting olefin, e.g. generally from the olefin with the smallest number of carbon atoms. Only when the fastest-reacting olefin has been consumed do the macromolecules begin to incorporate significant numbers of units composed of carbon monoxide and other olefins. This means that, for example, two olefins with very different reactivities processes of this type can therefore only give block copolymers whose macromolecules are composed specifically of two different blocks (see, for example, EP-A-429 105).

A common feature of the continuous and the batch processes is that only relatively low incorporation rates of slower-reacting olefins can be achieved. Polyketones obtained in this way therefore have properties which are only slightly better than those of polyketones merely built up from carbon monoxide and a single olefin.

Contrasting with said batch and continuous processes for preparing polyketones, EP-A-619 334 discloses a process which can achieve high incorporation rates of different olefins into a terpolymer. However, this process is complicated and the yields are low. The polymers obtainable are composed of macromolecules again built up from only at most two differing blocks.

It is an object of the present invention, therefore, to provide polyketone preparation processes which, with high catalyst activity and with the associated productivity, ensure high incorporation rates for both fast- and for slow-reacting olefins. A further object was to find polyketones which have high molecular weights and contain, besides carbon monoxide, high proportions of different olefins. The thermal and mechanical performance of these polyketones should be better than that of known carbon monoxide copolymers. In particular the polyketones should have high elasticity.

We have found that this object is achieved by a process for preparing linear, alternating carbon monoxide copolymers, in which at least one olefinically unsaturated compound having from two to twenty carbon atoms (component K1) and carbon monoxide are copolymerized in the presence of a) metal complexes of the formula (I)

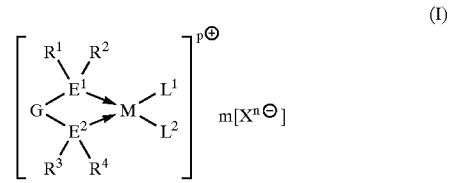

where:
G is a carbocyclic ring system having 5, 6 or 7 atoms, with or without one or more hetero atoms, —(CR$^b_2$)$_r$—, —(CR$^b_2$)$_s$—Si(R$^a$)$_2$—(CR$^b_2$)$_t$—, —A—O—B— or —A—Z(R$^5$)—B—, where R$^5$ is hydrogen, C$_1$–C$_{28}$-alkyl, C$_3$–C$_{14}$-cycloalkyl, C$_6$–C$_{15}$-aryl or alkylaryl having from 1 to 20 carbon atoms in the alkyl radical and from 6 to 15 carbon atoms in the aryl radical, —N(R$^b$)$_2$ or —Si(R$^a$)$_3$, where said radicals may also have substitution, A, B are —$(CR^b{}_2)_{r'}$—, —$(CR^b{}_2)_s$—$Si(R^a)_2$—$(CR^b{}_2)_t$—, —$N(R^b)$—, or a constituent having r'—, s—or t— atoms in a ring system, or, together with Z, are a constituent having (r'+1), (s+1) or (t+1) atoms in a heterocycle, $R^a$, independently of one another, are $C_1$–$C_{20}$-alkyl, $C_3$–$C_{10}$-cycloalkyl, $C_6$–$C_{15}$-aryl or alkylaryl having from 1 to 10 carbon atoms in the alkyl moiety and from 6 to 15 carbon atoms in the aryl moiety, where said radicals may also have substitution, $R^b$ is as $R^a$, or hydrogen or $Si(R^a)_3$, r is 1, 2, 3 or 4, r' is 1 or 2, s, t are 0, 1 or 2, where $1 \leq s+t \leq 3$, Z is a nonmetallic element from group 15 of the Periodic Table, M is a metal selected from the class consisting of groups 8 to 12 of the Periodic Table, $E^1$, $E^2$ are nonmetallic elements from group 15 of the Periodic Table, $R^1$ to $R^4$ are linear or branched $C_1$–$C_{28}$-alkyl, $C_3$–$C_{14}$-cycloalkyl, $C_6$–$C_{15}$-aryl or alkylaryl having from 1 to 28 carbon atoms in the alkyl moiety and from 6 to 15 carbon atoms in the aryl moiety, where said radicals may also have substitution, $L^1$, $L^2$ are formally charged or neutral ligands, X are formally mono- or polyvalent anions, p is 0, 1, 2 or 3, m, n are 0, 1, 2 or 3, where p=m×n, b) if desired, a protonic or Lewis acid, and c) if desired, a hydroxyl compound, which comprises metering into the copolymerization, as it proceeds, at least one olefinically unsaturated compound having from two to twenty carbon atoms (component K2, ≠component K1) in the form of pulses, i.e. as a regular or irregular sequence of feed, for which the term pulse is used, and non-feed, where the number of pulses is two or more.

According to the invention, therefore, a component K2 comprising olefinically unsaturated compounds is metered in the form of pulses into a polymerization of carbon monoxide and a component K1 comprising olefinically unsaturated compounds, as the polymerization proceeds.

In the novel process, component K2 is metered in the form of pulses into the copolymerization of carbon monoxide and component K1 while the copolymerization proceeds as described, by introducing component K2 into the reaction medium by means of a pressure which is higher than that in the reaction vessel, for example by way of injection.

The expression "in the form of pulses" here means, for the purposes of the present invention, that K2 is metered in as a regular or irregular sequence of feed, for which the term pulse is used, and non-feed, and that the duration of a feed, i.e. the duration of a "pulse" is short in comparison to the time between two pulses, i.e. without K2 feed.

The pulse duration is from 0.1 s to 5 min, preferably from 0.1 s to 1 min, particularly preferably from 0.1 to 10 s and in particular from 0.1 to 1 s. The individual pulses may, but need not, be of equal length.

The time between two pulses is usually from 1 min to 2 h, preferably from 2 to 60 min, particularly preferably from 5 to 45 min. The individual times between two pulses may, but need not, be identical.

The ratio of the time between two pulses and the pulse duration is usually from 2 to 100,000, preferably from 500 to 100,000, in particular from 1000 to 10,000.

The lower limit of the number of pulses is 2. There is in principle no upper limit to the number of pulses, but in practice the limit is the total duration of the copolymerization, which in the case of the batchwise copolymerization of carbon monoxide and component K1, for example, is from 1 to 72 hours, preferably from 2 to 24 hours, particularly preferably from 3 to 12 hours.

The amount of component K2 introduced during a pulse, compared with the entire amount of K1 used (based in each case on mol of olefin), is advantageously from 0.01 to 30%, preferably from 0.1 to 10% and particularly preferably from 0.2 to 5%.

In a preferred process according to the invention, the number of carbon atoms in at least one olefinically unsaturated compound of component K2 is less than or equal to that in the olefinically unsaturated compound which has the smallest number of carbon atoms in component K1.

In a particularly preferred embodiment of the novel process, the reactivity of at least one olefinically unsaturated compound of component K2 is higher or at least as high as that of the olefinically unsaturated compound having the highest reactivity in component K1.

In a very particularly preferred process according to the invention, K1 is propene and K2 is ethene.

Novel polyketones obtainable by the novel process have also been found.

A feature of the novel polyketones is that the macromolecules on which they are based have been built up from chain segments which differ from one another, where within each individual chain segment there is a random distribution of units built up from carbon monoxide and K1 and from carbon monoxide and K2, and where for any two successive chain segments it is generally true that V≠1, where V is defined as:

[(number of units built up from carbon monoxide and K1 in a given chain segment)/(number of units built up from carbon monoxide and K2 in a given chain segment)]/[(number of units built up from carbon monoxide and K1 in the next chain segment)/(number of units built up from carbon monoxide and K2 in the next chain segment)].

The use of the novel carbon monoxide copolymers for producing fibers, films or moldings has also been found.

Fibers, films and moldings essentially comprising novel carbon monoxide copolymers have also been found.

Possible olefinically unsaturated monomer compounds termed component K1 in said processes for preparing the carbon monoxide copolymers are in principle either pure hydrocarbon compounds or else heteroatom-containing α-olefins, such as (meth)acrylates or -amides, and homoallyl or allyl alcohols, ethers or halides. Suitable pure hydrocarbons are $C_2$–$C_{20}$-1-alkenes. Among these, emphasis is given to low-molecular-weight α-olefins, e.g. α-olefins having from 2 to 8 carbon atoms, such as ethene, propene, 1-butene, 1-pentene, 1-hexene and 1-octene. It is also possible, of course, to use cyclic olefins, e.g. cyclopentene or norbornene, or aromatic olefin compounds, such as styrene or α-methylstyrene, or vinyl esters, such as vinyl acetate. Propene is particularly preferred. It is also possible to use mixtures of said substances. Particular preference is given to mixtures of ethene with low-molecular-weight α-olefins, such as propene, 1-butene, 1-hexene, 1-octene or 1-decene. Mixtures of ethene and propene are very particularly preferred.

Possible olefinically unsaturated monomer compounds of component K2 are in principle the substances mentioned for component K1, with the proviso that at least one compound in K1 and K2 is different. Preference is given to low-molecular-weight α-olefins, e.g. α-olefins having from 2 to 8 carbon atoms, such as ethene, propene, 1-butene, 1-pentene, 1-hexene or 1-octene, in particular ethene.

The olefinically unsaturated compounds of component K2 are preferably selected in such a way that the reactivity of at least one of them in the novel process is higher or at least the same as that of the olefinically unsaturated compound which has the highest reactivity in component K1. The reaction rate in the novel process usually decreases as the number of carbon atoms in the olefinically unsaturated compounds increases. Components K1 and K2 are preferably selected in such a way that the number of carbon atoms in at least one olefinically unsaturated compound of component K2 is less than or equal to that in the olefinically unsaturated compound having the smallest number of carbon atoms in component K1. In particularly preferred embodiments of the invention, K1 is a mixture of propene and ethene, and K2 is ethene. Very particularly preferably, K1 is propene and K2 is ethene.

The bridging structural unit G in the metal complexes a) of the novel process is generally composed of mono- or polyatomic bridging segments. For the purposes of the present invention, a bridging structural unit is in principle a group which links the elements $E^1$ and $E^2$ to one another. Examples of structural units of this type are carbocyclic ring systems having 5, 6 or 7 atoms, with or without one or more heteroatoms. The ring systems may be aliphatic or aromatic. Preference is given to ring systems having 5 or 6 atoms, with 0, 1 or 2 heteroatoms selected from the group consisting of N, O or S.

The positions relative to one another of the bonds to the atoms $E^1$ and $E^2$ may be as desired. Preferred positions relative to one another are the 1,2, 1,3 and 1,4 positions.

Preferred embodiments of cyclic structural units G are the following (positions of bonding to $E^1$ and, respectively, $E^2$ have been indicated):

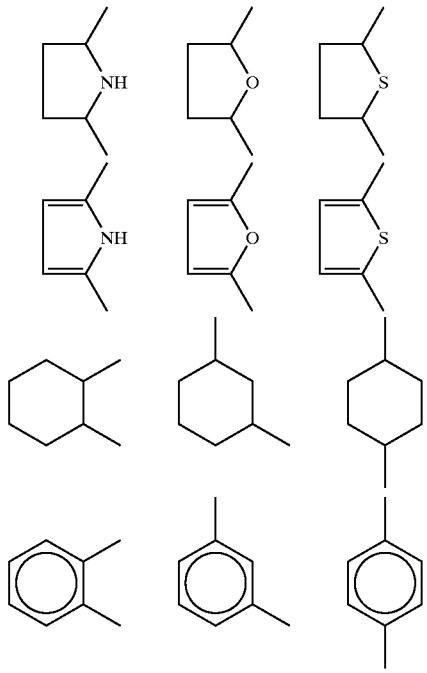

-continued

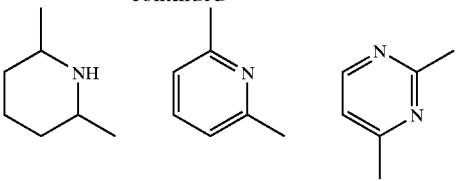

The bridging structural unit G may furthermore be a substituted or unsubstituted alkylene chain, or else an alkylene chain in which one alkylene unit has been replaced by a silylene group, by an amino or phosphino group or by an ethereal oxygen.

Among the monoatomically bridged structural units, preference is given to those having a bridging atom from group 14 of the Periodic Table, for example —$C(R^b)_2$— or —$Si(R^a)_2$—, where $R^a$, independently of one another, are in particular linear or branched $C_1$–$C_{10}$-alkyl, such as methyl, ethyl, isopropyl or tert-butyl, $C_3$–$C_6$-cycloalkyl, such as cyclopropyl or cyclohexyl, $C_6$–$C_{10}$-aryl, such as phenyl or naphthyl, or $C_6$–$C_{10}$-aryl substituted with functional groups containing the nonmetallic elements of groups 14, 15, 16 or 17 of the Periodic Table, for example tolyl, (trifluoromethyl) phenyl, dimethylaminophenyl, p-methoxyphenyl or partially halogenated or perhalogenated phenyl, or aralkyl having from 1 to 6 carbon atoms in the alkyl moiety and from 6 to 10 carbon atoms in the aryl moiety, for example benzyl, and $R^b$ is in particular hydrogen or $Si(R^a)_3$ or is as defined above for $R^a$. $R^a$ is in particular methyl, and $R^b$ is in particular hydrogen.

Among the systems bridged by more than one atom, emphasis should be given to the two-atom-, three-atom- and four-atom-bridged structural units, and preference is generally given to the use of the three-atom-bridged systems.

Suitable three-atom-bridged structural units are generally based on a chain made from carbon atoms, e.g. propene (—$CH_2CH_2CH_2$—), or on a bridging unit having a heteroatom from group 14, 15 or 16 of the Periodic Table, for example silicon, nitrogen, phosphorus or oxygen in the skeleton of the chain.

The bridging carbon atoms may generally have substitution by $C_1$–$C_6$-alkyl such as methyl, ethyl or tert-butyl, $C_6$–$C_{10}$-aryl, such as phenyl, or by functional groups which contain elements of groups 14, 15, 16 or 17 of the Periodic Table, e.g. triorganosilyl, dialkylamino, alkoxy, hydroxyl or halogen. Examples of suitable substituted propylene bridges are those having a methyl, phenyl, hydroxyl, trifluoromethyl, ω-hydroxyalkyl or methoxy group in the 2 position.

Among the polyatomically bridged structural units with a heteroatom in the skeleton of the chain, use is advantageously made of compounds in which Z is nitrogen or phosphorus, in particular nitrogen (see also formula (I)). The substituent $R^5$ on Z may in particular be: hydrogen, linear or branched $C_1$–$C_{28}$-alkyl, in particular $C_1$–$C_{20}$-alkyl, such as methyl, ethyl, isopropyl, tert-butyl, n-hexyl or n-dodecyl, $C_3$–$C_{14}$-cycloalkyl, in particular $C_3$–$C_8$-cycloalkyl, such as cyclopropyl or cyclohexyl, $C_6$–$C_{15}$-aryl, in particular $C_6$–$C_{10}$-aryl, such as phenyl, or alkylaryl having from 1 to 20 carbon atoms in the alkyl radical and from 6 to 10 carbon atoms in the aryl radical, for example benzyl Said alkyl and aryl radicals may be unsubstituted or substituted. Examples of possible substituents are functional groups which contain atoms of groups 14, 15, 16 or 17 of the Periodic Table. Those suitable include triorganosilyl, such as trimethylsilyl or tert-butyldiphenylsilyl, the carboxylic acid group or carboxylic acid derivatives, such as esters or amides, primary, secondary or tertiary amino groups, such as dimethyl amino or methylphenylamino, the nitro and hydroxyl groups, and also alkoxy, such as methoxy or ethoxy, the sulfonate group, and also halide atoms, such as fluorine, chlorine or bromine. For the purposes of the present invention, aryl includes substituted and unsubstituted heteroaryl, e.g. pyridyl or pyrrolyl. Alkyl radicals $R^5$ likewise include both long-chain alkylene groups having from 12 to 22 carbon atoms in the chain, which may have functional groups, such as the sulfonic acid, carboxylic acid, phosphoric acid, hydroxyl, amino or ammonium group, for example in a terminal position.

Preferred radicals $R^5$ also include groupings which have an electron-withdrawing substituent. Examples of suitable electron-withdrawing substituents are alkyl having one or more electron-withdrawing radicals, such as fluorine, chlorine, nitrile or nitro in the α- or β-position with respect to Z. Other suitable groups are aryl with said electron-withdrawing radicals. Radicals bonded directly to Z are also suitable, as are the nitrile, sulfonate and nitro groups. Examples of suitable electron-withdrawing alkyl radicals are the trifluoromethyl, trichloroethyl, difluoromethyl, 2,2,2-trifluoroethyl, nitromethyl and cyanomethyl groups. Examples of suitable electron-withdrawing aryl radicals are: m-, p-, o-fluoro- or chlorophenyl, 2,4-difluorophenyl, 2,4-dichlorophenyl, 2,4,6-trifluorophenyl, 3,5-bis(trifluoromethyl)phenyl, nitrophenyl, 2-chloro-5-nitrophenyl and 2-bromo-5-nitrophenyl. Other possible radicals $R^5$ in this context are carbonyl units so that if Z is nitrogen, Z and $R^5$ form a carboxamide function. A suitable radical of this type is the acetyl or trifluoroacetyl group.

Among the radicals $R^5$, particular preference is given to tert-butyl, phenyl, p-fluorophenyl, trifluoromethyl, 2,2,2-trifluoroethyl, pentafluorophenyl, 3,5-bis(trifluoromethyl)phenyl and ortho-difluorophenyl, e.g. 3,4-difluorophenyl, meta-difluorophenyl, e.g. 2,4-difluorophenyl, or para-difluorophenyl, e.g. 2,5-difluorophenyl.

Possible units A and B as in the formula (I) are substituted or unsubstituted $C_1$–$C_4$-alkylene units, e.g. methylene, ethylene, propylene, ethylidene, propylidene or benzylidene. Preference is given to methylene, ethylene, ethylidene and benzylidene, particularly to methylene.

A and B may also be a mono-, di-, tri- or tetraatomic constituent of an aliphatic or aromatic ring system. For example, A and B may be a methylene or ethylene unit of a cyclopropyl, cyclopentyl or cyclohexyl ring. Other possible ring systems are aliphatic and aromatic heterocycles.

A and B may, furthermore, be constituents of a heterocycle which is formed from components A—Z($R^5$)—B, A—Z—$R^5$ and, respectively, B—Z—$R^5$. A—Z—$R^5$ and respectively, B—Z—$R^5$ may, for example, form a substituted or unsubstituted pyrrolidine ring or piperidine ring.

Possible chelating atoms $E^1$ and $E^2$ may, independently of one another, be the nonmetallic elements of group 15 of the Periodic Table, and use is preferably made of nitrogen and phosphorus, in particular phosphorus. In a preferred embodiment, $E^1$ and $E^2$ in compounds of formula (I) are phosphorus.

In the novel process, the radicals $R^1$ to $R^4$ are unsubstituted or substituted $C_1$–$C_{28}$-alkyl, preferably $C_3$–$C_{20}$-alkyl, $C_3$–$C_{14}$-cycloalkyl, preferably $C_3$–$C_8$-cycloalkyl, $C_6$–$C_{15}$-aryl, preferably $C_6$–$C_{10}$-aryl, or alkylaryl having from 1 to 28 carbon atoms, preferably from 3 to 20 carbon atoms, in the alkyl moiety and from 6 to 15 carbon atoms, preferably from 6 to 10 carbon atoms, in the aryl moiety. Said radicals $R^1$ to $R^4$ may have one or more hydroxyl, amino or acid groups or an ionic functional group. Ionic functional groups are groups based on nonmetallic elements of groups 14 to 16 of the Periodic Table, e.g. sulfonate, phosphate, ammonium or carboxylate. $R^1$ to $R^4$ are preferably linear, branched or carbocycle-containing $C_1$–$C_{28}$-alkyl units or $C_3$–$C_{14}$-cycloalkyl units, or $C_6$–$C_{15}$-aryl units or alkylaryl groups having from 1 to 28 carbon atoms in the alkyl moiety and from 6 to 15 carbon atoms in the aryl moiety. In the case of substituted radicals $R^1$ to $R^4$ it is also possible to use the salts of the carboxylic, phosphoric, amino or sulfonic acids. Examples of suitable salts are the ammonium, alkylammonium, arylammonium, alkali metal or alkaline-earth metal salts, such as the carboxylates or sulfonates of sodium, potassium or magnesium.

Possible counterions for said ammonium radicals are in particular non-nucleophilic anions, as also used for the metal complexes a) (see anions X). Examples of particularly suitable counterions are p-toluenesulfonate, tetrafluoroborate, trifluoroacetate, trichloroacetate, hexafluorophosphate, hexafluoroantimonate and tetraarylborates.

Examples of particularly suitable aryl radicals $R^1$ to $R^4$ are aryl units with or without one or more, e.g. from 1 to 3, heteroatoms in the ring. These may also have substitution by one or two hydroxyl, carboxylic acid, sulfonic acid or amino groups. Among the aryl and, respectively, arylene radicals, $R^1$ to $R^4$ preference is given to phenyl(ene). The radicals $R^1$ to $R^4$ may, furthermore, also have more than two polar groups and, for example, may have four or six hydroxyl, ammonium or carboxylic acid groups. Preferred cycloaliphatic radicals $R^1$ to $R^4$ are the cyclopentyl and cyclohexyl radicals. Examples of other particularly suitable alkyl radicals $R^1$ to $R^4$ are alkylene units with or without one or two terminal hydroxyl, carboxylic acid, sulfonic acid or ammonium groups. In these cases, too, the radicals $R^1$ to $R^4$ may have more than two polar groups and may, for example, have four or six hydroxyl, ammonium or carboxylic acid groups. Accordingly, there may be differing functional groups on each of the radicals $R^1$ to $R^4$. The radicals $R^1$ to $R^4$ may also differ from one another in their number of functional groups. Examples of suitable functional groups are the hydroxyl, amine, carboxylic acid, phosphoric acid, ammonium and sulfonic acid groups.

The preparation of suitable propylene-bridged chelating-ligand compounds $(R^1)(R^2)E^1$—G—$E^2(R^3)(R^4)$, which are a constituent of the metal complex of formula (I) may, for example, start from the commercially available compound 1,3-dibromopropane. A double Arbuzov reaction, for example with triethyl phosphite, gives 1,3-bis(phosphonic acid) derivatives which can be converted by reduction into 1,3-diphosphinopropane, as described in "Methoden der organischen Chemie (Houben-Weyl)", 4th Edn., Vol. XII/1, Part 1, Georg Thieme Verlag, 1963, p. 62. 1,3-Diphosphinopropane opens up a flexible route using a hydrophosphination reaction with functionalized olefins to give substituted bisphosphines. The hydrophosphination generally proceeds via a free-radical mechanism and can be initiated thermally, photochemically or with the aid of a free-radical initiator. For thermal initiation the temperatures required are generally from 20 to 100° C. and the pressures required are generally from 0.1 to 5 bar. Examples of suitable free-radical initiators are di-tert-butyl peroxide and azobisisobutyronitrile. For photochemical initiation it is generally sufficient to irradiate with UV radiation from a high-pressure mercury lamp for a period of from 2 to 48 hours to give quantitative hydrophosphination. The products obtained by free-radical-initiated hydrophosphination processes are generally anti-Markovnikov products.

For preparing chelating ligands $R^1)(R^2)E^1$—G—$E^2(R^3)$ $(R^4)$ with radicals $R^1$ to $R^4$, which carry carboxylic acid groups, it has proven advantageous to start from olefinically unsaturated compounds which have been derivatized with appropriate carboxylic ester groups, and use these in the hydrophosphination reaction. The free carboxylic acids can then be obtained by hydrolysis using known methods.

Suitable chelating-ligand compounds $(R^1)(R^2)E^1$—G—$E^2(R^3)(R^4)$ may also be prepared under acid-catalysis conditions. Due to the isomerization of the olefinic double bond under the acid reaction conditions, the products obtained by this process are frequently mixtures. The hydrophosphination step is described, for example, in "Methoden der organischen Chemie (Houben-Weyl)", 4th Edn. Vol. XII/1, Part 1, Georg Thieme Verlag, 1963, pp. 25–28.

Any olefin is generally suitable for said hydrophosphination reaction. Suitable olefins include those which have appropriate functional groups, such as hydroxyl, amino, carboxylic acid, phosphoric acid, ammonium or sulfonic acid groups. Propenyl radicals may be used, for example, as may $C_4$–$C_{28}$-alkenes having at least one internal or terminal double bond and, if desired, one or more hydroxyl, amino, carboxylic acid, phosphoric acid, ammonium or sulfonic acid groups. Other possible compounds are olefinic compounds having aromatic radicals, where any functional group present may either be on the aliphatic or else on the aromatic radical, and examples are therefore 4-(1-pentenyl) benzoic acid and 3-phenylpent-5-enecarboxylic acid. Other suitable olefinic compounds have aliphatic carbocycles as a substituent in the alkylene chain. It is moreover also possible to use cyclic olefins, such as 3-cyclohexenol or 4-cyclo octenol. It is, of course, also possible to use olefins with two or more functional groups selected from the group consisting of the hydroxyl, amino, carboxylic acid, phosphoric acid, ammonium and sulfonic acid groups. In the hydrophosphination reaction of the α,ω-bisphosphines it is preferable to use suitable alkenes with an α-olefinic double bond. Examples of these include heteroatom-containing α-olefins, such as (meth)acrylates or -amides, or also homoallyl or allyl alcohols.

In the case of aromatic radicals $R^1$ to $R^4$, chelating ligands $(R^1)(R^2)E^1$—G—$E^2(R^3)(R^4)$ which contain sulfonic acid groups can be prepared by reacting chelating ligands which do not contain a sulfonic acid with $SO_3$, chlorosulfonic acid, fuming sulfuric acid or oleum, as described in Jiang et al., Macromolecules 27 (1994) 7215–7216 or Verspui et al., Chem. Commun., 1998, 401–402 or in J. March "Advanced Organic Chemistry", John Wiley & Sons (NY), 1985, $3^{rd}$ Edition pp. 473–475.

Other syntheses for chelating ligands $(R^1)(R^2)E^1$—G—$E^2(R^3)(R^4)$ having aromatic radicals $R^1$ to $R^4$ are described in:

"Phosphorus—An outline of its Chemistry, Biochemistry and Technical Chemistry" D. E. C. Corbridge, Elsevier (Amsterdam, Tokyo, New York) 1990, 4th Edition, Chapter 8, and literature cited therein S. O. Grim, R. C. Barth, J. of Organomet. Chem. 94, 1975, p.327

WO98/22482

In a particularly preferred embodiment of the chelating ligand $(R^1)(R^2)E^1$—G—$E^2(R^3)(R^4)$, the aryl substituent radicals $R^1$ and $R^4$ have from 6 to 15 carbon atoms, in particular from 6 to 10 carbon atoms, and may also have substitution. Examples of suitable chelating ligands $(R^1)(R^2)E^1$—G—$E^2(R^3)(R^4)$ are:

1,3-bis[diphenylphosphino]propane,
1,3-bis[di(o-methoxyphenyl)phosphino]propane,
1,3-bis[di(4-phenylbutyl)phosphino]propane,
1,3-bis[di(5-phenylpentyl)phosphino]propane,
1,3-bis[di(hydroxyphenyl)phosphino]propane,
1,3-bis[di(sulfophenyl)phosphino]propane, preferably as meta-isomer, and its salts,
1,3-bis[di(carboxyphenyl)phosphino]propane and its salts,
1,3-bis[di(o-methoxyhydroxyphenyl)phosphino]propane,
1,3-bis[di(4-(sulfophenyl)butyl)phosphino]propane, Na salt,
1,3-bis[di(5-(sulfophenyl)pentyl)phosphino]propane, Na salt,
bis(diphenylphosphinomethyl)phenylamine,
bis(diphenylphosphinomethyl)tert-butylamine,
bis(diphenylphosphinomethyl)-(2,4-difluorophenyl)amine and
bis(diphenylphosphinomethyl)-(2,2,2-trifluoroethyl)amine.

Particularly preferred among said chelating ligand compounds are those in which $R^1$ to $R^4$ are phenyl, unsubstituted or substituted by one or more, e.g. 1 to 3, hydroxyl, sulfo or carboxyl groups.

In a particularly preferred embodiment of the chelating ligand $(R^1)(R^2)E^1$—G—$E^2(R^3)(R^4)$, the alkyl substituent radicals $R^1$ to $R^4$ have from 4 to 22 carbon atoms, in particular from 5 to 20 carbon atoms, and may also have substitution.

Examples of suitable chelating ligands $(R^1)(R^2)E^1$—G—$E^2(R^3)(R^4)$ are:

1,3-bis(dibutylphosphino)propane,
1,3-bis(dihexylphosphino)propane,
1,3-bis(diheptylphosphino)propane,
bis[(dibutylphosphino)methyl]phenylamine,
bis[(dihexylphosphino)methyl]phenylamine,
bis[(diheptylphosphino)methyl]phenylamine,
1,3-bis(di-4-hydroxybutyl)phosphinopropane,
1,3-bis(di-6-hydroxyhexyl)phosphinopropane,
1,3-bis(di-7-hydroxyheptyl)phosphinopropane,
1,3-bis(di-8-hydroxyoctyl)phosphinopropane,
1,3-bis(di(3-hydroxycyclopentyl)propyl)phosphinopropane,
1,3-bis[di-6-(sulfo)hexyl]phosphinopropane,
1,3-bis[di-8-(sulfo)octyl]phosphinopropane,
1,3-bis[di(3-(sulfo)cyclopentyl)propyl]phosphinopropane,
1,3-bis(di-propylmalonoyl)phosphinopropane,
1,3-bis(di-6-hexanoyl)phosphinopropane,
1,3-bis(di-7-heptanoyl)phosphinopropane,
bis[(di-4-hydroxybutyl)phosphinomethyl]phenylamine,
bis[(di-6-hydroxyhexyl)phosphinomethyl]phenylamine,
bis[(di-7-hydroxyheptyl)phosphinomethyl]phenylamine,
bis[(di-3-hydroxycyclopentyl)propyl]phenylamine,
bis[(di-6-(sulfo)hexyl)phosphinomethyl]phenylamine,
bis[(di-7-(sulfo)heptyl)phosphinomethyl]phenylamine,
bis[(di(3-sulfocyclopentyl)propyl)phosphinomethyl] phenylamine,
bis[(di-6-hexanoyl)phosphinomethyl]phenylamine,
bis[(di-7-heptanoyl)phosphinomethyl]phenylamine and
1,3-bis[di(4-methylol-5-hydroxyisopentyl)] phosphinopropane.

Particularly preferred among said chelating ligand compounds are those in which $R^1$ to $R^4$ are a hexyl, 4-methylpentyl, octyl, cyclopentyl or cyclohexyl radical which is unsubstituted or substituted by a hydroxyl or carboxylic acid group.

Suitable metals M of the novel process are the metals of groups 8, 9, 10, 11 and 12 of the Periodic Table of the Elements, i.e., in addition to iron, cobalt and nickel, mainly the platinum metals such as ruthenium, rhodium, osmium, iridium and platinum and very particularly preferably palladium. In the complexes of the formula (I), the metals may be formally uncharged or formally carry a single or triple positive charge or, preferably, a double positive charge.

Suitable formally charged anionic ligands $L^1$ and $L^2$ are hydride, halides, sulfates, phosphates or nitrates. Carboxylates or salts of organic sulfonic acids, such as methylsulfonate, trifluoromethylsulfonate or p-toluenesulfonate, are furthermore suitable. Among the salts of organic sulfonic acids, p-toluenesulfonate is preferred. Preferred formally charged ligands $L^1$ and $L^2$ are carboxylates, preferably $C_1$- to $C_{20}$-carboxylates, in particular $C_1$- to $C_7$-carboxylates, e.g. acetate, trifluoroacetate, propionate, oxalate, citrate or benzoate. Acetate is particularly preferred.

Other suitable formally charged organic ligands $L^1$ and $L^2$ are aliphatic $C_1$- to $C_{20}$ radicals, cycloaliphatic $C_3$- to $C_{30}$ radicals, $C_7$- to $C_{20}$-aralkyl radicals having $C_6$- to $C_{14}$-aryl radicals and $C_1$- to $C_6$-alkyl radicals, and aromatic $C_6$- to $C_{20}$ radicals, for example methyl, ethyl, propyl, isopropyl, tert-butyl, n-pentyl, isopentyl, cyclohexyl, benzyl, phenyl and aliphatically or aromatically substituted phenyl radicals.

Suitable formally uncharged ligands $L^1$ and $L^2$ are in general Lewis bases, i.e. compounds having at least one free electron pair. Lewis bases whose free electron pair or whose free electron pairs is or are present on a nitrogen or oxygen atom are particularly suitable, for example nitriles R-CN, ketones, ethers, alcohols or water. $C_1$- to $C_{10}$-nitriles, such as acetonitrile, propionitrile or benzonitrile, or $C_2$- to $C_{10}$-ketones, such as acetone or acetylacetone, or $C_2$- to $C_{10}$-ethers, such as dimethyl ether, diethyl ether or tetrahydrofuran, are preferably used. In particular, acetonitrile, tetrahydrofuran or water is used.

In principle, the ligands $L^1$ and $L^2$ may be present in any desired ligand combination, i.e. the metal complex (I) may contain, for example, a nitrate and an acetate radical, a p-toluenesulfonate and an acetate radical or a nitrate and a formally charged organic ligand, such as methyl. In the metal complexes, $L^1$ and $L^2$ are preferably present as identical ligands.

Depending on the formal charge of the complex fragment containing the metal M, the metal complexes contain anions X. If the M-containing complex fragment is formally uncharged, the novel complex of the formula (I) contains no anion X. Advantageously used anions X are those which have very little nucleophilicity, i.e. a very small tendency to undergo a strong interaction, whether ionic, co-ordinate or covalent, with the central metal M.

Suitable anions X are, for example, perchlorate, sulfate, phosphate, nitrate and carboxylates, for example acetate, trifluoroacetate, trichloroacetate, propionate, oxalate, citrate or benzoate, and conjugated anions of organosulfonic acids, for example methylsulfonate, trifluoromethylsulfonate and para-toluenesulfonate, and furthermore tetrafluoroborate, tetraphenylborate, tetrakis(pentafluorophenyl)borate, tetrakis[bis(3,5-trifluoromethyl)phenyl]borate, hexafluorophosphate, hexafluoroarsenate or hexafluoroantimonate. Preference is given to the use of perchlorate, trifluoroacetate, sulfonates, such as methylsulfonate, trifluoromethylsulfonate or p-toluenesulfonate, tetrafluoroborate or hexafluorophosphate and in particular trifluoromethylsulfonate, trifluoroacetate, perchlorate, p-toluenesulfonate or tetrafluoroborate.

Examples of suitable defined metal complexes a) are the following palladium(II) acetate complexes:

[1,3-bi ,(diphenylphosphino)propane]-,
[1,3-bis(di-o-methoxyphenylphosphino)propane]-,
[1,3-bis(dibutylphosphino)propane]-,
[1,3-bis(dipentylphosphino)propane]-,
[1,3-bis(dihexylphosphino)propane]-,
[1,3-bis(dioctylphosphino)propane]-,
[1,3-bis(dicyclohexylpropylphosphino)propane]-,
[1,3-bis(dihydroxyphenylphosphino)propane]-,
[1,3-bis(di-4-hydroxybutylphosphino)propane]-,
[1,3-bis(di-4-methylol-5-hydroxypentylphosphino) propane]-,
[1,3-bis(di-5-hydroxypentylphosphino)propane]-,
[1,3-bis(di-6-hydroxyhexylphosphino)propane]-,
[1,3-bis(di(3-hydroxycyclopentyl)propylphosphino) propane]-,
[1,3-bis(di-8-hydroxyoctylphosphino)propane]-,
[1,3-bis(di-3-hydroxycyclohexylpropylphosphino) propane]-,
[1,3-bis(disulfonatophenylphosphino)propane]-,
[1,3-bis(di-4-sulfonatobutylphosphino)propane]-,
[1,3-bis(di-4-methylol-5-sulfonatopentylphosphino) propane]-,
[1,3-bis(di-5-sulfonatopentylphosphino)propane]-,
[1,3-bis(di-6-sulfonatohexylphosphino)propane]-,
[1,3-bis(di(3-sulfonatocyclopentyl)propylphosphino) propane]-,
[1,3-bis(di-8-sulfonatooctylphosphino)propane]-,
[1,3-bis(di-3-sulfonatocyclohexylpropylphosphino) propane]-,
[1,3-bis(dicarboxyphenylphosphino)propane]-,
[1,3-bis(di-4-carboxybutylphosphino)propane]-,
[1,3-bis(di-4-methylol-5-carboxypentylphosphino) propane]-,
[1,3-bis(di-5-carboxypentylphosphino)propane]-,
[1,3-bis(di-6-carboxyhexylphosphino)propane]-,
[1,3-bis(di(3-carboxycyclopentyl)propylphosphino) propane]-,
[1,3-bis(di-8-carboxyoctylphosphino)propane]-,
[1,3-bis(di-3-carboxycyclohexylpropylphosphino)propane],
[bis(diphenylphoshinomethyl)phenylamine]-,
[bis(diphenylphosphinomethyl)tert-butylamine]-,
[bis(diphenylphosphinomethyl)(2,4-difluorophenyl)amine]- and
[bis(diphenylphosphinomethyl)(2,2,2-trifluoroethyl) amine]-palladium(II) acetate.

Specific metal complexes of formula (I) may be prepared by the following processes.

The neutral chelate complexes (p=0) are prepared by using the chelating ligands $(R^1)(R^2)E^1$—G—$E^2(R^3)(R^4)$, the meaning of which is described above, in an exchange with weakly co-ordinating ligands, such as 1,5-cyclooctadiene, benzonitrile or tetramethylethylenediamine, bonded to the appropriate transition metal compounds, such as transition metal halides, alkyl transition metal halide compounds or diorganyl transition metal compounds.

The reaction is generally carried out in a polar solvent, such as acetonitrile, acetone, ethanol, diethyl ether, dichloromethane or tetrahydrofuran or mixtures of these, at from −78 to +90° C.

Neutral metal complexes of formula (I) in which $L^1$ and $L^2$ are carboxylate, e.g. acetate, may also be prepared by reacting transition metal salts, such as $Pd(OAc)_2$ with the chelating ligands $(R^1)(R^2)E^1$—G—$E^2(R^3)(R^4)$ as described, in acetonitrile, acetone, ethanol, diethyl ether, dichloromethane, tetrahydrofuran or water at room temperature. Solvent mixtures may also be used here.

Another possible synthetic method is the reaction of the metal complexes of the formula (I) with organometallic compounds of groups 1, 2, 12 or 14, such as $C_1$- to $C_6$-alkyl compounds of the metals lithium, aluminum, magnesium, tin or zinc, exchanging formally charged inorganic ligands $L^1$, $L^2$, as defined above for formally charged aliphatic, cycloaliphatic or aromatic ligands $L^1$, $L^2$, as also described above. The reaction is generally carried out in a solvent, such as diethyl ether or tetrahydrofuran, at from −78 to 65° C.

Monocationic complexes of the formula (I) ((p=1) may be obtained, for example, by reacting (chelating ligand)(organo) metal (acetate) or (chelating ligand)(organo) metal (halide) complexes with stoichiometric amounts of a metal salt M'X. The reactions are generally carried out in co-ordinating solvents, such as acetonitrile, benzonitrile, tetrahydrofuran or ether, at from −78 to 65° C.

It is advantageous if the metal salts M'X fulfil the following criteria. The metal M' should preferably form low-solubility metal halides, such as silver chloride. The salt anion should preferably be a non-nucleophilic anion X, as defined above.

Examples of salts with good suitability for forming cationic complexes are silver tetrafluoroborate, silver hexafluorophosphate, silver trifluoromethanesulfonate, silver perchlorate, silver para-toluene sulfonate, silver trifluoroacetate and silver hexafluoroantimonate, sodium tetraphenyl borate, sodium tetrakis (pentafluorophenyl)borate, silver trifluoroacetate and sodium tetrakis(3,5-bis(trifluoromethyl)phenyl)borate.

The preparation of the dicationic complexes (p=2) is similar to that of the monocationic complexes except that instead of the (chelating ligand)(organo) metal (acetate) complexes or the (chelating ligand)(organo) metal (halogeno) complexes the precursor used is the (chelating ligand)metal (diacetate) complex or, respectively, the (chelating ligand)metal (dihalogeno) complex and also two equivalents of the metal salt.

Another possible process for preparing the dicationic complexes of (I) is the reaction of $[Q_4M]X_2$ with the chelating ligands $(R^1)(R^2)E^1—G—E^2(R^3)(R^4)$ defined at the outset. Q here are identical or different weak ligands, such as acetonitrile, benzonitrile or 1,5-cyclooctadiene, and M and X are as defined above.

The preparation of the tricationic complexes (p=3) of formula (I) is analogous to the processes mentioned.

A preferred process for preparing the metal complexes of the formula (I) is the reaction of the dihalometal precursor complexes with silver salts containing non-coordinating anions.

For catalyst activation use may be made of suitable acids b). Possible activator compounds are either mineral protonic acids or else Lewis acids. Examples of suitable protonic acids are sulfuric acid, nitric acid, boric acid, tetrafluoroboric acid, perchloric acid, p-toluenesulfonic acid, trifluoroacetic acid, trifluoromethanesulfonic acid and methanesulfonic acid. Use is preferably made of p-toluenesulfonic acid or tetrafluoroboric acid.

Examples of possible Lewis acids are boron compounds, such as triphenylborane, tris(pentafluorophenyl)borane, tris(p-chlorophenyl)borane and tris(3,5-bis(trifluoromethyl)phenyl)borane, or compounds of aluminum, of zinc, of antimony or of titanium which have Lewis-acid character. It is also possible to use mixtures of protonic acids or of Lewis acids, or else protonic and Lewis acids mixed.

Hydroxyl compounds c) suitable as coactivators are any of the substances which have one or more hydroxyl groups. Preference is given to lower alcohols having from 1 to 6 carbon atoms, such as methanol, ethanol, n- or isopropanol, n-butanol, sec-butanol or tert-butanol. It is also possible to use aromatic hydroxyl compounds, e.g. phenol. Examples of other suitable compounds are sugars, such as fructose, glucose and lactose. Polyalcohols, such as ethylene glycol and glycerol are also suitable, as is polyvinyl alcohol. It is, of course, also possible to use mixtures of two or more coactivators.

The novel copolymerization of carbon monoxide and olefinically unsaturated compounds of components K1 and K2 in the presence of the metal complexes a) or of their individual components and, if desired, acid b) and, if desired, hydroxyl compound c) features the metering-in of component K2 in the form of pulses into a copolymerization of carbon monoxide and component K1 as the copolymerization proceeds.

The copolymerization of carbon monoxide and component K1 may proceed in solution or suspension in an organic or aqueous medium, or also in principle in the gas phase. Examples of suitable solvents or suspension media are aliphatic or aromatic hydrocarbons, such as pentane, hexane, heptane, ligroin, cyclohexane, benzene, toluene, xylene, alcohols, such as methanol, ethanol, n-propanol, isopropanol, n-butanol and isobutanol, ethers, such as diethyl ether and p-dioxane, halogenated hydrocarbons, such as dichloromethane, chlorobenzene and o-dichlorobenzene, and also sulfolane, dimethylsulfoxide pyridine, dimethylformamide, N-methylpyrrolidone, cyclohexanone, acetone, water, phenol, cresol, acetonitrile and mixtures of these compounds.

Preferred solvents or suspension media are dichloromethane, water, methanol and toluene.

The copolymerization of carbon monoxide and component K1 may be carried out either batchwise, e.g. in stirred autoclaves, or else continuously, e.g. in tubular reactors, loop reactors or cascades of stirred reactors. In the case of batchwise conduct of the reaction, carbon monoxide, component K1, metal complex a) or its constituents, acid b) if desired, hydroxyl compound c) if desired and solvent if desired form the initial charge, while for the continuous conduct of the reaction individual said reactants or reaction media, or more than one of these, or all of these are introduced continuously to the reaction system.

Addition of the activator species b) may be dispensed with if the chelating ligand has radicals $R^1$ to $R^4$ which have at least one free sulfonic acid group or carboxylic acid group. The presence of the coactivator c) may similarly be dispensed with, in particular if a solvent containing hydroxyl groups is used.

For reproducibly good productivity, the polymerization mixture is preferably intensively mixed. For this, use may be made of suitable stirrers, such as anchor or helical stirrers. Suitable stirring rates are from 100 to 1100 rpm, preferably above 150 rpm.

There are in principle two methods for forming and using the catalytically active species a). In one version, the above-mentioned specified metal complexes a) are used directly, i.e. these complexes are prepared separately and added per se to the reaction mixture or as an initial charge in the reaction vessel. In a second version, the individual constituents forming the catalytically active species are added to the reaction mixture. In the case of this in-situ generation of the catalyst, the metal M is usually introduced to the reaction vessel in the form of a salt or as a complex salt. The chelating ligand compound $(R^1)(R^2)E^1—G—E^2(R^3)(R^4)$ and the ligands $L^1$ and $L^2$ are also added. Higher productivities are generally associated with the use of defined metal complexes a) than with the in-situ process.

The molar ratio of carbon monoxide to olefinically unsaturated compounds of component K1 generally ranges from 5:1 to 1:500, and the values usually used are from 2:1 to 1:100.

The amount of metal complex a), or of its individual constituents, usually used is from $10^{-7}$ to $10-3$ mol, based on the amount of metal M, per mole of unsaturated compounds of component K1, and an amount of from $10^{-6}$ to $10^{-4}$ mol of M per mole of unsaturated compounds of component K1 is preferred.

The molar ratio of activator b) to metal complex a), based on the amount of metal M, is generally from 60:1 to 1:1, preferably from 25:1 to 2:1 and particularly preferably from 12:1 to 3:1 for cases where the functional groups of the radicals $R^1$ to $R^4$ are not sulfonic acid functions or carboxylic acid functions. It is, of course, also possible to add activator compound b) to the polymerization mixture when the metal complexes have chelating ligands which carry the abovementioned functional acid groups.

The molar ratio of hydroxyl compound c) to metal complex a), based on the amount of metal M, is generally from 100,000 to 0, preferably from 50,000 to 500 and particularly preferably from 10,000 to 1000.

The copolymerization temperature is generally set at from 0 to 200° C., preferably from 20 to 130° C. The pressure is generally from 2 to 300 bar, in particular from 20 to 220 bar.

The average catalyst activities obtained in the novel process are generally above 0.2 kg of polymer per g of metal per hour.

The polyketones formed from carbon monoxide and components K1 and K2 are isolated and purified by usual methods, for example precipitation and filtration or taking off the solvent, washing and drying.

The novel process for preparing carbon monoxide copolymers is in principle suitable for components K2 whose reactivity is greater than, the same as or smaller than that of component K1. However, the reactivity of K2 is preferably greater than that of K1. The following principle then applies to the build-up of the novel polyketones.

As it proceeds, the polymerization of carbon monoxide and component K1 forms in the polymer chain a segment built up from alternating K1 and CO, i.e. exclusively from K1/CO units. If after a particular time a pulse is fed of component K2, which in a preferred embodiment is faster to react than K1, CO and K2 are incorporated preferentially into the growing polymer chain. In the macromolecule a segment is therefore formed in which there is random distribution of K2/CO units and K1/CO units, with the former represented in greater numbers. As consumption of K2 increases, the proportion of K1/CO units in said segment rises. Eventually the residual concentration of K2 becomes so low that as the polymer molecule continues to grow another segment is formed which is composed practically exclusively of K1/CO units. Said procedure may in principle be repeated as many times as desired.

If the reactivities of K1 and K2 differ very greatly, e.g. by a factor of 1000 or more, then each individual segment is composed exclusively of K1/CO units or K2/CO units. This therefore gives a block copolymer. If the reactivities of K1 and K2 are identical, following a pulse there is random incorporation of K1 and K2 into the newly begun segment, and the proportion of K2/CO units here then depends only on the ratio of concentrations of K1 and K2. This proportion falls as the length of the segment increases, and eventually its value approaches zero once K2 has been almost completely consumed. Another new segment is then built up in the macromolecule and is composed practically exclusively of K1/CO units.

The novel carbon monoxide copolymers therefore have the feature that the macromolecules have been built up from chain segments which differ from one another, where within each individual chain segment there is a random distribution of units built up from carbon monoxide and K1 and from carbon monoxide and K2, and where for any two successive chain segments it is generally true that $V \neq 1$, where V is defined as:

[(number of units built up from carbon monoxide and K1 in a given chain segment)/(number of units built up from carbon monoxide and K2 in a given chain segment)]/[(number of units built up from carbon monoxide and k1 in the next chain segment)/(number of units built up from carbon monoxide and K2 in the next chain segment)].

V is preferably <0.9 or V>1.1.

The novel process therefore generally gives polymers whose properties feature a combination of the properties of the individual segments. It is therefore possible to combine rigid, amorphous or semicrystalline segments with flexible segments.

The specific build-up of the macromolecules in the novel polyketones gives the copolymer, for example, an elastic matrix formed from K1/CO-rich segments, stiffened by K2/CO-rich segments which, for example, form stable crystallites. This structure of the polymer is the reason for the excellent mechanical properties, in particular the outstanding elasticity.

The novel carbon monoxide copolymers are typically composed of from 1 to 99% by weight, preferably from 20 to 80% by weight, of the units which have been built up from carbon monoxide and K1, and from 99 to 1% by weight, preferably from 80 to 20% by weight, of units which have been built up from carbon monoxide and K2.

The molecular weights $M_w$ obtained are from 30,000 to 1,200,000, preferably from 80,000 to 500,000, particularly preferably from 100,000 to 400,000.

The polydispersities of the novel carbon monoxide copolymers are usually from 1.5 to 5.

The novel polyketones may be used unmodified or with further additives in the manner common for thermoplastics by means of extrusion, injection molding, blow molding or else other shaping processes involving casting or compression, to produce fibers, films or moldings.

Examples of the additives which may be used are the following substances.

Preferred fibrous fillers and fibrous reinforcing materials are carbon fibers, potassium titanate whiskers, aramid fibers and particularly preferably glass fibers. To improve compatibility with the matrix material, these may have been provided with a size or with a coupling agent. The carbon fibers and glass fibers used generally have a diameter of from 6 to 20 µm.

The glass fibers may be incorporated either in the form of short glass fibers or else in the form of continuous strands (rovings). The average length of the glass fibers in the finished injection molding is preferably from 0.08 to 0.5 mm.

Carbon fibers or glass fibers may also be used in the form of fabrics, mats or glass filament rovings.

Particularly suitable particulate fillers are amorphous silica, magnesium carbonate, chalk, powdered quartz, mica, talc, feldspar, glass beads and in particular calcium silicates, such as wollastonite, and aluminum silicates, such as kaolin (in particular calcined kaolin). These too, mostly have a coating of size.

The pigments commonly used for pigmenting thermoplastics are well known, see for example R. Gächter and H.

Müller, Taschenbuch der Kunststoffadditive, Carl Hanser Verlag, 1983, pp. 494 to 510. A first preferred group of pigments is that of white pigments, such as zinc oxide, zinc sulfide, white lead (2PbCO$_3$.Pb(OH)$_2$), lithopones, antimony white and titanium dioxide. Of the two most common crystalline modifications of titanium dioxide, (rutile and anatase), the rutile form in particular is used for white coloration of the novel molding compositions.

Black pigments which may be used are iron oxide black (Fe$_3$O$_4$), spinell black (Cu(Cr,Fe)$_2$O$_4$), manganese black (a mixture of manganese dioxide, silicone and iron oxide), cobalt black and antimony black, and also particularly preferably carbon black, mostly as furnace black or gas black (see in this connection G. Benzing, Pigmente für Anstrichmittel, Expert-Verlag (1988), pp. 78 et seq.).

It is, of course, also possible to use inorganic color pigments, such as chromium oxide green, or organic color pigments, such as azo pigments and phthalocyanines, to achieve particular shades. Pigments of this type are generally available commercially.

Examples of oxidation retarders and heat stabilizers which may be added to the novel polyketones are halides of metals of group 1 of the Periodic Table, e.g. sodium halides, potassium halides or lithium halides, if desired combined with copper(I) halides, e.g. chlorides, bromides or iodides. The halides, in particular those of copper, may also contain electron-rich π-ligands. Examples of copper complexes of this type are Cu halide complexes with, for example, triphenylphosphine. It is also possible to use zinc fluoride and zinc chloride. Other compounds which may be used are sterically hindered phenols, hydroquinones, substituted representatives of this class, secondary aromatic amines, if desired combined with phosphorus-containing acids or, respectively, their salts or esters or mixtures of these compounds.

Other suitable additives for CO-olefin copolymers are inorganic phosphates, sulfates, borates, hydroxides or oxides. Preference is given here to phosphates of the alkaline-earth metals, for example Ca$_3$(PO$_4$)$_2$ or hydroxyapatite.

Flame retardants which may be used are in particular phosphorus-containing compounds. Examples of these are phosphoric esters, phosphinic esters, phosphine oxides, phosphorus and organic phosphates. The phosphorus-containing compounds may also be used in a mixture with a triazine derivative or polytetrafluoroethylene. Preference is given to the use of triarylphosphine oxides or triaryl phosphates.

Examples of UV stabilizers are various substituted resorcinols, salicylates, benzotriazoles and benzophenones.

Lubricants and mold-release agents are stearic acid, stearyl alcohol, alkyl stearates and stearamides, and also esters of pentaerythritol with long-chain fatty acids. It is also possible to use stearates of calcium, of zinc or of aluminum, or else dialkyl ketones, e.g. distearyl ketone. Other suitable compounds are copolymers of olefins and acrylic acids or acrylates as processing aids.

The novel fibers, films or moldings are suitable, for example, for use in the automotive, electrical or electronics sectors.

The novel process is particularly effective in terms of achievable catalyst activities, molecular weight and the distribution of these, and also in relation to achievable incorporation rates of olefins with different reactivities. The novel carbon monoxide copolymers have excellent thermal and mechanical properties, in particular excellent elasticity.

The examples below further illustrate the present invention without limiting the same.

EXAMPLES 1 to 3

100 ml of CH$_2$Cl$_2$, rendered absolute using LiAlH$_4$, 30 mg of [Pd(dppp)(NCCH$_3$)$_2$](BF$_4$)$_2$(dppp=1,3-bis (diphenylphosphino)propane) and 0.25 ml of methanol were placed in a 250 ml stirred autoclave. 100 g of propene were then condensed into the autoclave, which was then closed, the stirrer speed is set to 1000 rpm and carbon monoxide was introduced at room temperature until the total pressure was 60 bar. The total pressure of 60 bar was held constant over the entire polymerization which followed, by continuously introducing further CO under pressure. The polymerization took place at room temperature. After respectively 90 minutes (example 1), 60 minutes (example 2) and 30 minutes (example 3) a pulse of ethene was in each case passed into the autoclaves for 0.1 seconds. The ethene here had been prepressurized to 75 bar. The amount of ethene introduced during one pulse was 0.4 g. The total reaction time was 10 hours. The reaction was terminated by releasing the pressure in the reaction vessel. The reaction solution was diluted with CH$_2$Cl$_2$, and filtered through silica gel. After evaporating off the solvent, the carbon monoxide copolymers were obtained as clear elastic films. These, and also the polyketones obtained in the (comparative) examples below, were tested by the methods described below.

NMR spectra were recorded in CDCl$_3$ solution using a 500 MHz, NMR AMX 500 manufactured by Bruker, and infrared spectra were recorded using films or KBr pressings using a Bruker FT-IR IFS 113v® spectrometer. Elemental analyses were determined using a Heraeus CHN-rapid®. Tensile stress/strain measurements were made with a Zwick 1445® at 10 mm/min. The samples for the tensile stress/strain measurements were films produced by solution in CH$_2$Cl$_2$ followed by evaporation. The samples for atomic force microscopy were applied to mica from a 0.1 g/l CH$_2$Cl$_2$ solution by spin casting and annealed for 20 min at 80° C. The instrument used was a nanoscope III® manufactured by Digital Instruments, Santa Barbara, Calif. The images were prepared in tapping mode at a resonance frequency of about 360 kHz. Gel permeation chromatography measurements used a Waters GPC® with CHCl$_3$, Styrage columns® and a refractive index detector, against a polystyrene standard.

Comparative Example 4

The experiment was carried out as described for examples 1 to 3, except that no ethene was metered in. A carbon monoxide-propene copolymer was obtained as product.

Comparative Example 5

The experiment was carried out as described for Example 4, except that the initial charge was 97.9 g of propene and 2.1 g of ethene instead of 100 g of propene.

Table 1 below shows a comparison of characteristic data for the polymers obtained in examples 1 to 3 (polymers 1 to 3) and comparative examples 4 and 5 (polymers C4 and C5).

TABLE 1

| Polymer | Proportion of ethene[a] | Glass transition temperature[b] | $M_w$[c] | $M_w/M_n$[d] | Yield/g | Solubility[e] |
|---|---|---|---|---|---|---|
| 1 | about 20 | 18.5 | 150,000 | 2.2 | 10 | good |
| 2 | about 30 | 13.6 | 180,000 | 2.2 | 12 | good |
| 3 | about 50 | 9.7 | 450,000 | n.b.[f] | 16 | good |

TABLE 1-continued

| Polymer | Proportion of ethene[a] | Glass transition temperature[b] | $M_w$[c] | $M_w/M_n$[d] | Yield/g | Solubility[e] |
|---|---|---|---|---|---|---|
| C4 | 0 | 21.6 | 230,000 | 1.8 | 8 | good |
| C5 | about 50 | 6.8 | 120,000 | 3.0 | 4 | good |

[a]% by weight of ethene, based on the total olefin content of the polymer (determined by elemental analysis and $^1$H-NMR, accuracy of measurement about +/− 5% by weight)
[b]° C. (determined by differential scanning colorimetry (DSC))
[c]g/mol (determined by gel permeation chromatography)
[d]determined by gel permeation chromatography
[e]in $CH_2Cl_2$
[f]not determined

We claim:

1. A process for preparing linear, alternating carbon monoxide copolymers, in which at least one olefinically unsaturated compound having from two to twenty carbon atoms (component K1) and carbon monoxide are copolymerized in the presence of
   a) metal complexes of the formula (I)

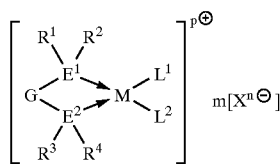

where:
G is a carbocyclic ring system having 5, 6 or 7 atoms, with or without one or more hetero atoms, $-(CR^b{}_2)_{r'}-$, $-(CR^b{}_2)_s-Si(R^a)_2-(CR^b{}_2)_t-$, $-A-O-B-$ or $-A-Z(R^5)-B-$, where
$R^5$ is hydrogen, $C_1-C_{28}$-alkyl, $C_3-C_{14}$-cycloalkyl, $C_6-C_{15}$-aryl or alkylaryl having from 1 to 20 carbon atoms in the alkyl radical and from 6 to 15 carbon atoms in the aryl radical, $-N(R^b)_2$ or $-Si(R^a)_3$, where said radicals may also have substitution,
A, B are $-(CR^b{}_2)_{r'}-$, $-(CR^b{}_2)_s-Si(R^a)_2-(CR^b{}_2)_t-$, $-N(R^b)-$, or a constituent having r', s or t atoms in a ring system, or, together with Z, are a constituent having (r'+1), (s+1) or (t+1) atoms in a heterocycle,
$R^a$, independently of one another, are $C_1-C_{20}$-alkyl, $C_3-C_{10}$-cycloalkyl, $C_6-C_{15}$-aryl or alkylaryl having from 1 to 10 carbon atoms in the alkyl moiety and from 6 to 15 carbon atoms in the aryl moiety, where said radicals may also have substitution,
$R^b$ is as $R^a$, or hydrogen or $Si(R^a)_3$,
r is 1, 2, 3 or 4,
r' is 1 or 2,
s, t are 0, 1 or 2, where 1 3 s+t 3 3, Z is a nonmetallic element from group 15 of the Periodic Table,
M is a metal selected from the class consisting of groups 8 to 12 of the Periodic Table,
$E^1$, $E^2$ are nonmetallic elements from group 15 of the Periodic Table,
$R^1$ to $R^4$ are linear or branched $C_1-C_{28}$-alkyl, $C_3-C_{14}$-cycloalkyl, $C_6-C_{15}$-aryl or alkylaryl having from 1 to 28 carbon atoms in the alkyl moiety and from 6 to 15 carbon atoms in the aryl moiety, where said radicals may also have substitution,
$L^1$, $L^2$ are formally charged or neutral ligands,
X are formally mono- or polyvalent anions,
p is 0, 1, 2 or 3,
m, n are 0, 1, 2 or 3,
where p=m×n,
b) if desired, a protonic or Lewis acid, and
c) if desired, a hydroxyl compound, which comprises metering into the copolymerization, as it proceeds, at least one olefinically unsaturated compound having from two to twenty carbon atoms (component K2≠component K1) in the form of pulses, i.e. as a regular or irregular sequence of feed, for which the term pulse is used, and non-feed, where the number of pulses is two or more.

2. A process as claimed in claim 1, wherein the number of carbon atoms present in at least one olefinically unsaturated compound of component K2 is smaller than or equal to that in the olefinically unsaturated compound having the smallest number of carbon atoms in component K1.

3. A process as claimed in claim 1, wherein the reactivity of at least one olefinically unsaturated compound of component K2 is higher or at least the same as that of the highest-reactivity olefinically unsaturated compound in component K1.

4. A process as claimed in claim 1, wherein K1 is propene and K2 is ethene.

5. A process as claimed in claim 1, wherein the pulse duration is from 0.1 s to 5 min.

6. A process as claimed in claim 1, wherein the time between two pulses is from 10 min to 2 h.

7. A process as claimed in claim 1, wherein the ratio of the time between two pulses and the pulse duration is from 2 to 100,000.

8. A process as claimed in claim 1, wherein the amount of component K2 introduced during a pulse, compared with the entire amount of component K1 used, is from 0.01 to 30 mol % of olefin.

9. A carbon monoxide copolymer obtained by a process as claimed in claim 1.

10. Carbon monoxide copolymers as defined in claim 9 in the form of a fiber, a film or a molding.

* * * * *

UNITED STATES PATENT AND TRADEMARK OFFICE
CERTIFICATE OF CORRECTION

PATENT NO. : 6,670,443 B1
DATED : December 30, 2003
INVENTOR(S) : Queisser et al.

It is certified that error appears in the above-identified patent and that said Letters Patent is hereby corrected as shown below:

Column 19,
Lines 34, 35, 42 and 43, should be together on one line.
Line 55, "1  3 s+t 3 3" should be -- $1 \leq s+t \leq 3$ --.

Signed and Sealed this

Twenty-ninth Day of June, 2004

JON W. DUDAS
*Acting Director of the United States Patent and Trademark Office*